(No Model.) 2 Sheets—Sheet 1.
J. H. LANGTON.
PORTABLE SAWING MACHINE.
No. 531,195. Patented Dec. 18, 1894.
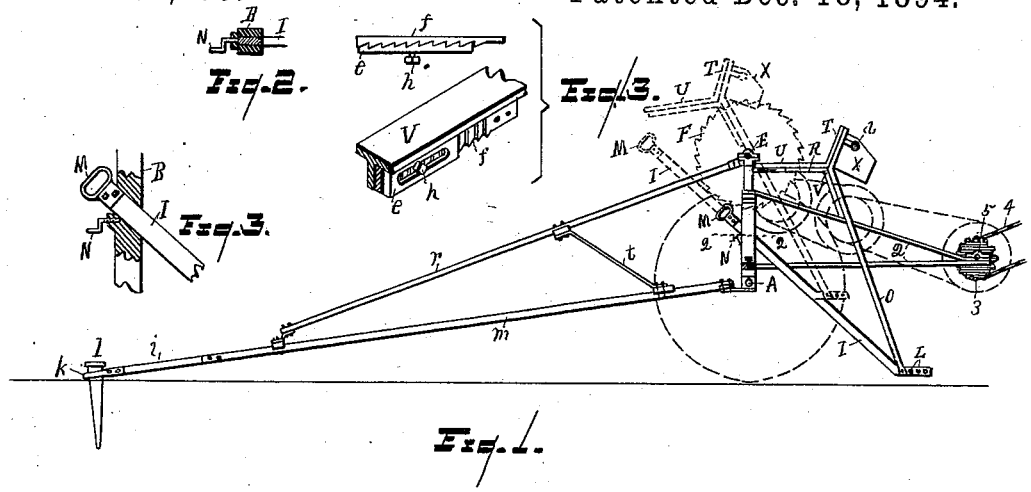
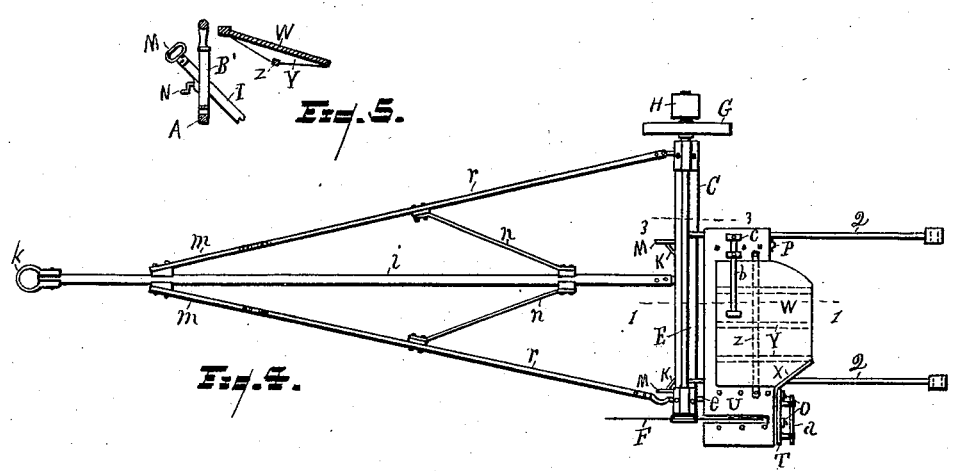
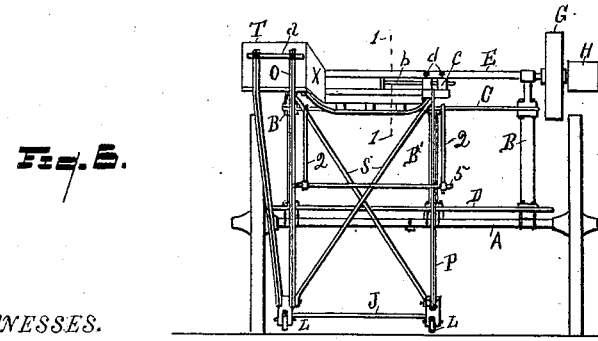
WITNESSES. INVENTOR.
Benjamin F. Wilcox. James H. Langton.
Alfred L. Phillips By Lucius C. West,
Atty.

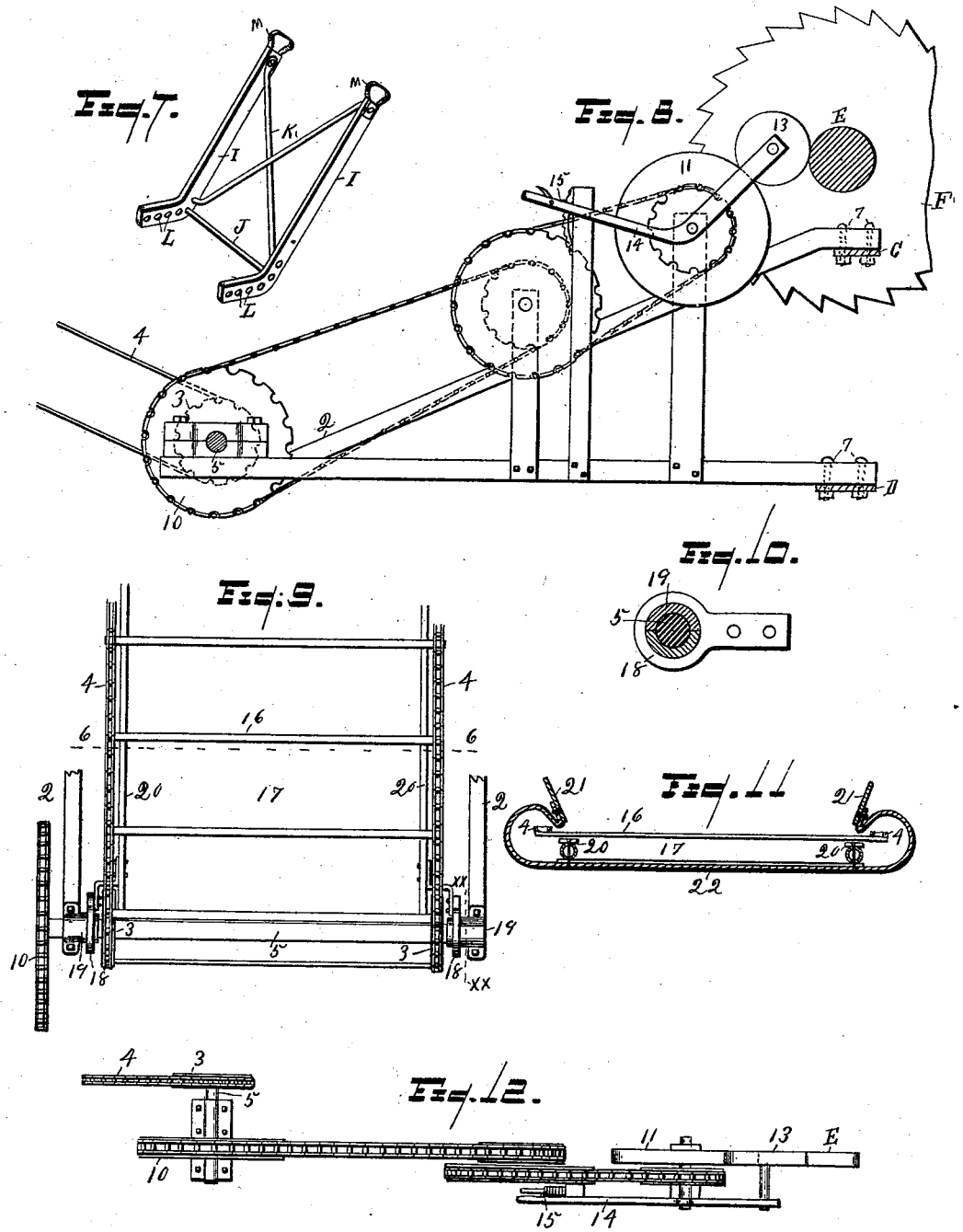

UNITED STATES PATENT OFFICE.

JAMES H. LANGTON, OF CENTREVILLE, MICHIGAN.

PORTABLE SAWING-MACHINE.

SPECIFICATION forming part of Letters Patent No. 531,195, dated December 18, 1894.

Application filed May 16, 1894. Serial No. 511,467. (No model.)

*To all whom it may concern:*

Be it known that I, JAMES H. LANGTON, a citizen of the United States, residing at Centreville, in the county of St. Joseph and State of Michigan, have invented a new and useful Portable Sawing-Machine, of which the following is a specification.

This invention relates to sawing machines which employ circular saws, and swinging saw feeding jacks for handling the wood in feeding it to and from the saw.

The object of the invention is to construct a portable sawing machine, in which the swinging saw feeding jack is supported by the wheeled axle, preferably by pivotally attaching the lower end of the saw feeding jack to a frame which frame is supported clear of the ground, by being attached to pillars, said pillars being attached to the axle and projecting upward therefrom.

A further object is to construct a portable sawing machine having a swinging saw feeding jack supported clear of the ground by the wheeled axle, and having a tongue-frame attached to the front side of said axle, said tongue-frame converging to the front end, and having a single point of contact with the ground, and this at said front end, the entire machine being thus supported by only three points of contact with the ground, viz., at the front end of the tongue-frame as stated, and the two wheels which support the axle, thus necessitating only one point of anchoring the machine to the ground, this being at the front end of the tongue-frame, the advantages of which will be especially appreciated on uneven ground.

A further object is to combine with a sawing machine having a swinging saw feeding jack, an endless carrier-elevator for removing the wood after being sawed.

Other objects will appear in the peculiarities of construction of the different parts described and claimed below.

In the drawings forming a part of this specification, Figure 1 is a side elevation; Fig. 2, an enlarged cross section on line 2—2 in Fig. 1, looking from a point above; Fig. 3, broken details from Fig. 1, enlarged; Fig. 4, a plan of parts in Fig. 1; Fig. 5, a cross section of parts on line 1—1 in Figs. 4 and 6, looking from a point at the left in Fig. 6; Fig. 7, an enlarged perspective view of the frame to which the saw feeding jack is pivoted in Figs. 1 and 6; Fig. 8, an enlarged view of parts in Fig. 1, looking against the opposite side of that shown in said Fig. 1, parts being in section on line 3—3 in Fig. 4; Fig. 9, a broken plan of the elevator carrier; Fig. 10, a section on line $xx-xx$ in Fig. 9, looking from a point at the right; Fig. 11, cross section on line 6—6 in Fig. 9, also showing parts not in Fig. 9; Fig. 12, a plan of Fig. 8; and Fig. 13, shows enlarged details from Figs. 1 and 4, below described.

Referring to the lettered parts of the drawings, A is the wheeled axle, to the upper side of which the pillars are attached, and extend upwardly therefrom. There are two of these pillars B, B, one on each side of the machine, and one B' between them, Figs. 1, 3, 5, and 6. Two transverse bars C, D, are attached to the pillars B, one a little above the axle A, and the other near the upper end of the pillars, Fig. 6. The pillar B', only extends up to the bar C, to which it is attached.

The saw arbor E, has bearings on the upper ends of the side pillars B, the saw F, being attached to one end of said arbor, and a balance wheel G, and a pulley H, being attached to the other end.

The frame to which the saw feeding jack is pivotally attached, consists of two oblique bars I, a cross bar J, at the lower end, and crossed braces K, said bars I, being bent horizontally at the lower end, and provided with a series of adjusting holes L, and each bar having a handle M, at the upper end, Figs. 1, 3, 4, 5, and 7. This frame is adjustably supported from the pillars on the axle A, by passing the bars I, loosely through slots in one of the pillars B, and the pillar B'. Figs. 1, 2, and 3, show the idea, a portion of the pillar B, in Fig. 3, being broken away, and Fig. 2, being in cross section, showing one of the bars I, through the slot, and also showing a set screw N, extending through the edge of the pillar into the slot, and engaging the bar I, to hold said bar in the desired position. The purpose of thus adjusting the jack supporting frame is to raise it and the jack to a higher position, and hold them there, when moving the machine from one location to another, to prevent their coming in contact with the ground when the tongue-frame is raised from the ground. This adjustment is indicated in Fig. 1, by dotted position, in which position the saw feeding jack rests against the saw arbor E.

The saw feeding jack is composed of upright bars O, P, attached together by crossed braces S, Fig. 6, the lower ends of said bars being adjustably pivoted to the horizontal ends L' of the jack supporting frame which bears the series of holes L as seen in Fig. 1. The bars O, extend up against the back board T, of the top U, of the jack, Figs. 1, 4, and 6, and are attached to said back board. These bars O, P, have horizontal branches V, near the upper end to support the top U, to which they are attached. The top U, has a depressed central portion, called a throat, with metal bottom W, open at the rear, and having a guard X, at the side next to the operator, said guard inclining rearwardly from the back board T, Figs. 4, and 5. The bottom W, is made more solid by a series of cross pieces Y, beneath, and a truss bar Z, transversely to and beneath the cross pieces Y, Figs. 4, and 5. Attached to the back side of the back board T, is a handle a, by which to operate the saw feeding jack.

The top U, of the saw feeding jack is provided with a gash in the usual manner to receive the saw F when said jack is swung forward in the act of feeding the stick of wood onto the saw, Fig. 4. On the other end of the top U, is a gage to fix the length of wood sawed, consisting of a headed rod b, capable of being moved endwise in holes in the blocks c, and in which blocks c, the headed rod is held at the desired position by set screws d, in said blocks, Fig. 6.

In the operation of the saw feeding jack and in the use of the gage, the jack having been swung back on its pivots clear of the saw F, the stick of wood is laid on the top U, with the end of the stick against the head of gage-rod b, and the jack is then swung forward, feeding the stick of wood against the saw. When the end of the stick is sawed off it falls into the throat of the top U, onto the metal bottom W, and the jack is then swung backward with sufficient force to throw the stick out of the throat, and onto the elevator carrier if in use, and if not, of course onto the ground or pile of wood. It will now be clearly seen that the saw feeding jack is really supported by the wheeled axle A, although indirectly as here shown by the jack supporting frame and pillars; but this frame and the saw feeding jack itself, being so susceptible of varied changes in construction, I desire to make prominent the idea of supporting a pivoted, swinging, saw feeding jack from the wheeled axle in a portable machine, as contrasted with swinging saw feeding jacks in stationary machines. The further importance of this will be shown farther on in the description, in connection with the tongue-frame.

The object of having the saw feeding jack adjustable back and forward, where it is pivoted at L, is to accommodate saws of varying sizes, and in connection with this feature I employ an adjustable stop e, at the front side of the top U, of the jack, Figs. 4, and 13. If I wish to use a saw too large for the length of gash in the top U, I move the stop e, forward, and since this stop strikes against one of the pillars B, Fig. 4, the saw feeding jack will not swing so far forward. After adjusting the stop e, as just explained, I adjust the lower end of the jack, or the bars O, P, thereof, to the rearward by changing the pivots into another one of the holes L, Figs. 1, and 7. This preserves the proper sweep of the saw feeding jack when swinging, so that the stop e, will strike at the proper place on the pillar B.

The stop e, may be made of course in different ways, but the one illustrated in Fig. 13, will show the idea. At f, is a serrated plate attached to the side of the bar V. The stop plate e, has a serrated face engaging the serrations of the plate f. The stop plate has an elongated slot through which a set-screw h, is passed and screwed into the plate f. The tongue-frame consists of a long rod i, preferably made of tubular pipe, attached at one end centrally to the axle A, and having an eye k, at the front end through which the anchoring pin l, is passed and driven into the ground, Fig. 1. Side braces m, m, are attached at one end to the axle A, near each end thereof, and converge to the rod i, and near the front end where they are attached to said rod. These side braces m, m, are braced by braces n, n, attached to them and to the rod i, as in Fig. 4. Above the side braces m, m, are braces r, r, attached at one end to the upper end of the side pillars B, B, and at the other end to the side braces m, m, at a point well toward their forward end. The braces m, and r, are preferably made of tubular pipe, and are braced by braces t, as in Fig. 1. It will be seen that the braces r, r, in connection with the rod i, and braces m, m, firmly hold the pillars, and parts attached to them in their upright position, when the tongue-frame has its front end resting on the ground as in Fig. 1. So great is the vertical leverage of this tongue-frame with the axle A, as its fulcrum, that the center of gravity of the entire machine is located well forward of the axle A, to that degree that it is scarcely necessary to stake down the forward end, except to prevent lateral canting. Thus the saw feeding jack, and its supporting frame, are firmly supported clear of the ground from the pillars over the axle A, and what is also very important, only three places and very small, if reasonably near to being on a like plane, are necessary to support the machine, one being for the end of the tongue-frame, and one for each wheel, it matters not how uneven the intervening ground may be, or if the machine has to stand astride of a stump or log. The saw feeding jack thus supported by its supporting-frame is in proper position to swing back and forth to and from the saw and the elevator carrier and tends to counterbalance the tongue-frame on the axle fulcrum.

There is a peculiar tendency in this sawing machine over machines for other purposes supported on two wheels, to laterally cant alternately as the intermittent strain is brought to bear at the saw-end of the arbor against the steady strain of the belt at the other end of said arbor, especially when the elevator-carrier is not employed and the log on the feeding-jack is of considerable length and weight with one end on the pile or ground, which tendency is overcome by the peculiar and great leverage purchase both laterally and vertically of the tongue-frame since it is attached to both the top of the pillars and to the axle.

In the use of stationary machines it is the practice to load them onto and off from the tank wagon which accompanies the engine, by the aid of four or more men, when moving to different localities, while my portable machine can be drawn to the place of use by attaching it to the rear of the tank wagon; and when moving the machine from one position to another at a given place of use, one man is all that is needed. He first removes the belt from the pulley H, (no belt here shown) raises the saw feeding jack and its supporting frame by grasping the handles M, one in each hand; removes the single anchor pin l, then raises the tongue-frame, balancing the machine on its axial fulcrum, and easily hauls it to place; sets it in proper alignment, and again drives the anchor pin.

I have designed for use with the saw feeding jack, when desired, an elevator carrier, to be detachably attached to the machine.

At 2, in Figs. 1, 4, 6, 8, and 9, are two frames, one of which is for supporting a series of speed reducing gears as in Fig. 8, so that the high rate of speed at which the saw arbor E, runs, will be greatly reduced when it is imparted to the sprocket gears 3, which drive the chains 4, of the elevator carrier. These gears 3, are mounted on a shaft 5, which shaft has bearings in the rear ends of the frames 2, Figs. 1, 6, 8, and 9. By this means the gear 10, which drives the shaft 5, does not have to be unduly large. The frames 2, are attached at their forward ends to the transverse bars C, D, of the pillars B, over the axle A, by detachable bolts 7, Fig. 8. Contact of the gears is made with the saw arbor E, by friction gears 11, and 13, Figs. 8, and 12. The friction gear 13, is made adjustable by being attached to the end of a pivoted adjustable lever 14. In Figs. 8, and 12, the friction gear 13, is in contact with the periphery of the saw arbor E, and the friction gear 11, as when in operation. Bearing down on the free end of the lever 14, will throw the parts out of gear and stop the carrier elevator. The lever 14, is locked in its adjusted positions by pawl and ratchet 15. By means of this friction gear 13, in this relation with the saw arbor and the other gears, less breakage would occur, if any at all, in case the elevator carrier got caught in any way, than would be the case if belt or sprocket gear were employed.

The endless carrier chains 4, on the sprocket gears 3, in practice of course pass around other sprocket gears at the upper end of the elevator carrier, in the ordinary manner of such constructions, said upper sprocket gears not being here shown, since the upper end of the carrier is shown broken away, thus indicating that it may be of any desired length. The chains 4, carry slats 16, which slats pass over the top of the sides 20, of the metal bottom trough 17, and catching against the end of the sticks of wood slide them up the trough and deliver them off the upper end. As before stated the sticks of wood (not here shown) are delivered onto the elevator carrier from the throat of the saw feeding jack when it is swung back. The trough 17, is pivoted at the lower end to the boxes 19, of the shaft 5, by eyes 18, which eyes are attached to the sides of the trough 17, and surround said boxes, Figs. 9, and 10. By this means the upper end of the elevator carrier may be raised and lowered as desired.

In Fig. 11, I have shown side boards 21, over the sides 20, of the trough 17, with a space left between to allow the slats to pass up the carrier. These side boards 21, are held in place by bars 22, transversely beneath the trough, and attached thereto, each end of said bars being bowed upward and around the chains 4, then bent back upon themselves and bolted to the side boards. Only one of the bars 22, is here shown, but of course as many would be employed throughout the length of the elevator carrier as needed to properly support the side boards. No bars 22, and side boards 21, are shown in Fig. 9, and need not be employed at all unless desired, but Fig. 11, will be sufficient to show the idea when they are used, their use being of course to guard against the sticks of wood flying over the sides of the trough of the elevator carrier.

My design is that the elevator carrier shall be manufactured as a separate attachment for the portable sawing machine so that the latter will be a complete machine without it so far as sawing the wood is concerned, and that parties desiring the attachment can readily combine it with the machine.

Having thus described my invention, what I claim as new, and desire to secure by Letters Patent of the United States, is—

1. A wood sawing machine, comprising a single wheeled axle a suitable support attached to and extending immediately above said axle, the saw and its arbor with bearings on said support, a swinging saw feeding-jack supported from said upwardly extending support on the axle, and bars forming a tongue-frame rigidly attached to said support and axle and convergingly extending forward therefrom, whereby the saw feeding-jack is supported by a single wheeled axle from a point above and immediately over said axle, substantially as set forth.

2. A wood sawing machine, comprising a single wheeled axle, a suitable support attached to and extending immediately upward from said axle, a saw and its arbor having bearings on said support, a supporting-frame for sustaining the saw feeding-jack, said supporting-frame being attached to the support above the axle and extending downwardly and rearwardly therefrom, a swinging saw feeding-jack pivotally attached at its lower end to the lower end of said supporting-frame, and a tongue-frame rigidly attached to the axle and the support thereon, and convergingly extending forward therefrom, the entire machine having three points of contact with the ground, substantially as set forth.

3. In a wood sawing machine, the combination of a single wheeled-axle, a suitable support attached to and extending immediately above said axle, a supporting-frame for sustaining the saw feeding-jack, said supporting-frame being adjustably attached to the support above the axle, and a saw feeding-jack pivotally attached to said supporting-frame at its lower end, substantially as set forth.

4. In a wood sawing machine, the combination of a single wheeled-axle, a suitable support attached to and extending immediately above said axle, a supporting-frame for sustaining the saw feeding-jack, said supporting-frame being attached to the support above the axle and extending downwardly and rearwardly therefrom, a saw feeding-jack adjustably pivoted at its lower end to one of a series of holes in the foot of the supporting-frame, and an adjustable stop attached to the upper front side of the saw feeding-jack, in keeping with its lower end adjustment, substantially as set forth.

5. A wood sawing machine, comprising a single wheeled-axle, pillars attached to and extending upward from said axle, a saw and its arbor having bearings on said pillars, a tongue-frame rigidly attached to the pillars and axle and convergingly extending forward therefrom, the downwardly and rearwardly extending supporting-frame for sustaining the saw feeding-jack, said supporting-frame being adjustably attached to the pillars above the axle, and a swinging saw feeding-jack pivotally attached at its lower end to the supporting-frame, substantially as set forth.

6. In a wood sawing machine, the combination of a suitable saw arbor-support, a swinging saw feeding-jack pivotally fulcrumed at its lower end in the rear of said support, and having the central depressed throat to receive the sawed stick of wood, the side frames detachably attached at the forward ends to the saw arbor-support and extending rearwardly therefrom, an elevator carrier having its driving shaft at its lower end, said shaft having bearings on the free ends of said rearwardly extending side frames in the rear of the saw feeding-jack so that the elevator carrier receives the wood delivered from the throat of the saw feeding-jack when swung backward, and mechanism for driving the elevator carrier, in which mechanism are the friction gears one of which is adjustable for detachable contact with the saw arbor, whereby detaching the side frames separates the sawing machine from all connection with the elevator carrier and its driving mechanism, substantially as set forth.

7. A portable wood sawing machine, comprising a wheeled-axle, pillars attached to and extending upward therefrom, a saw and its arbor having bearings on said pillars, a tongue frame attached to said axle and pillars and converging to a single point of contact with the ground at the front end, the downwardly and rearwardly extending supporting-frame for sustaining the saw feeding-jack, said supporting-frame being adjustably attached to the pillars above the axle, a swinging saw feeding-jack pivotally and adjustably attached to said supporting-frame at the lower end, and an adjustable stop attached to said saw feeding-jack in position to strike against one of the pillars, substantially as set forth.

8. The elevator carrier, comprising the bottom board and side pieces, the side-boards above said side pieces forming spaces between, the transverse slats having their ends in said spaces, the side chains attached to the ends of said slats, and the transverse bars beneath the bottom-board having their ends bowed around the chains and bent back upon themselves and attached to the side boards, substantially as set forth.

In testimony of the foregoing I have hereunto subscribed my name in the presence of two witnesses.

JAMES H. LANGTON.

Witnesses:
BENJAMIN F. WILCOX,
RUFUS POWERS.